E. B. LANE.
THERMOSTAT.
APPLICATION FILED NOV. 4, 1916.
1,254,814.
Patented Jan. 29, 1918.
2 SHEETS—SHEET 1.
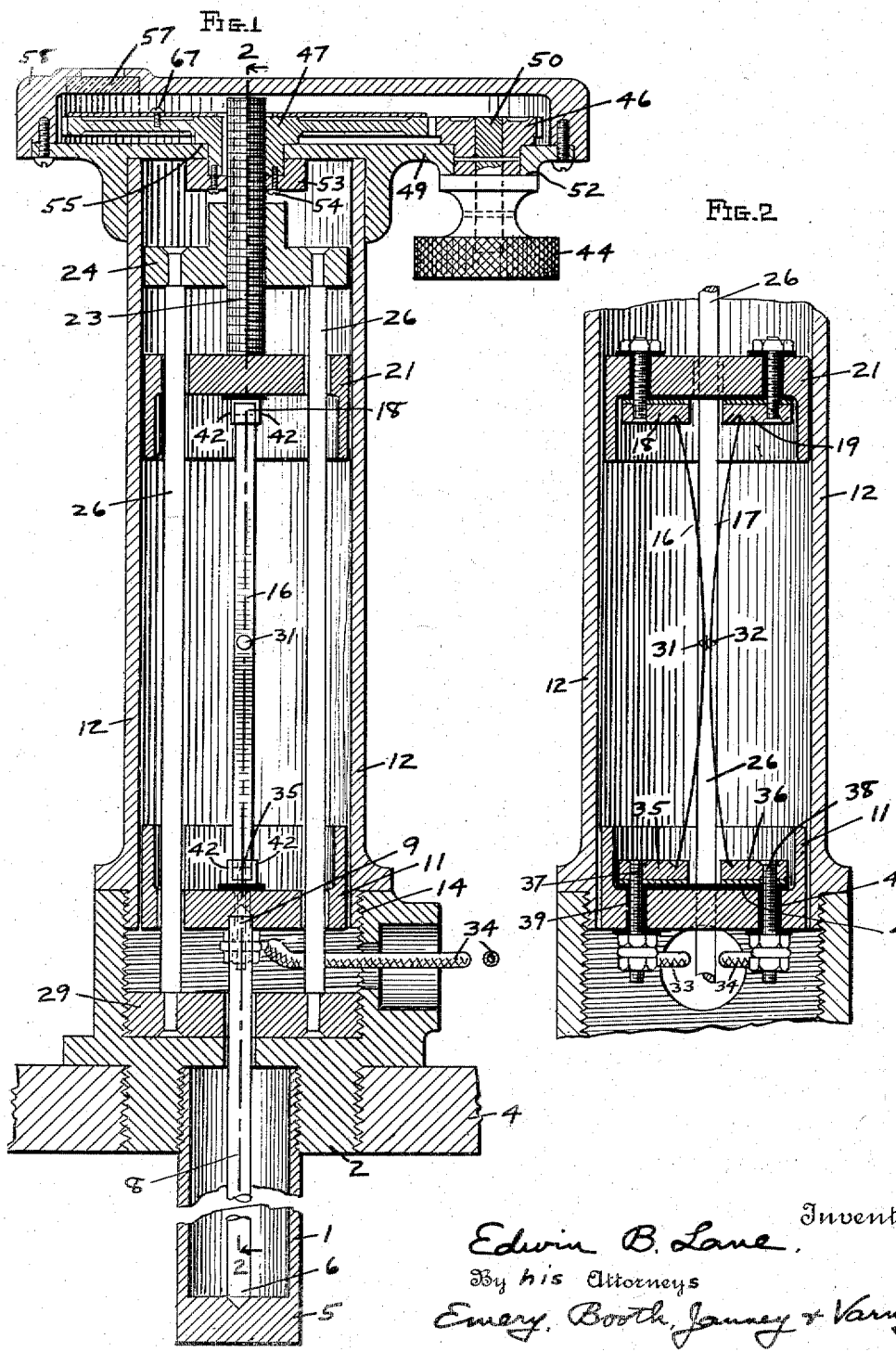
Edwin B. Lane, Inventor
By his Attorneys
Emery, Booth, Janney & Varney

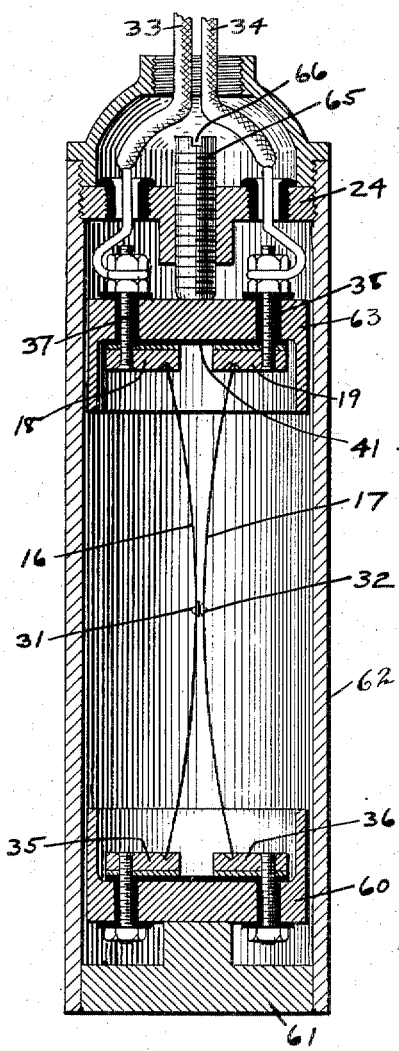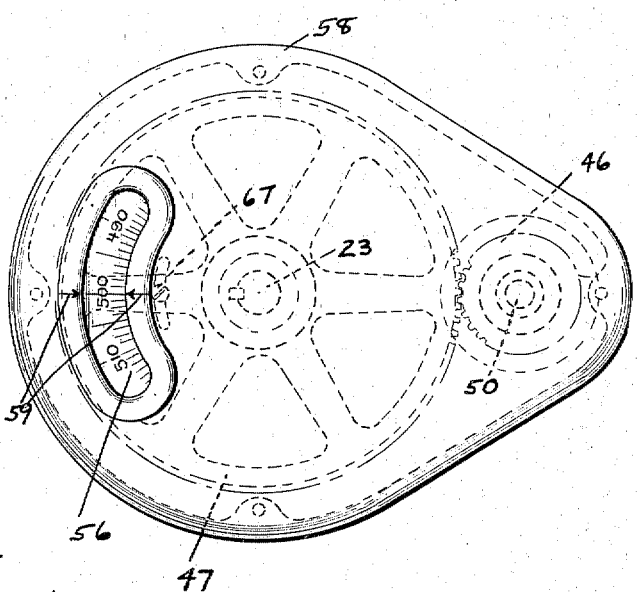

UNITED STATES PATENT OFFICE.

EDWIN B. LANE, OF WEST HOBOKEN, NEW JERSEY.

THERMOSTAT.

1,254,814.  Specification of Letters Patent.  Patented Jan. 29, 1918.

Application filed November 4, 1916. Serial No. 129,605.

*To all whom it may concern:*

Be it known that I, EDWIN B. LANE, a citizen of the United States, and a resident of West Hoboken, in the county of Hudson and State of New Jersey, have invented an Improvement in Thermostats, of which the following is a specification.

This invention relates to thermostats, and with regard to certain more specific features, to a temperature-controlled contact device adapted to open and close an electric circuit.

Among the objects of the invention may be noted the provision of a simple and inexpensive thermostat that is proof against vibration and operating at a comparatively high pressure at the contact points, and yet sensitive to minute changes of temperature. Other objects will be in part obvious and in part pointed out hereinafter.

The invention accordingly comprises the features of construction and operation, combinations of elements, and arrangements of parts which are exemplified in the structure hereinafter described and the scope of the application of which will be indicated in the following claims.

In the accompanying drawings, in which are shown one or more of various possible embodiments of this invention, Figure 1 is a sectional elevation of a preferred form of thermostat.

Fig. 2 is a sectional elevation on the line 2—2 of Fig. 1, showing the central portions of the thermostat as they appear in a plane at right angles to the plane in which Fig. 1 is taken.

Fig. 3 is a sectional elevation of a modified thermostat adapted for measuring or controlling temperatures not detrimental to the contact-making devices.

Fig. 4 is a top plan of Fig. 1.

Similar reference characters indicate similar parts throughout the several views of the drawings.

Referring now to Figs. 1, 2 and 4, there is illustrated a thermostat comprising an expanding tube 1 screw-threaded into a casing 2, which in turn may be threaded into the wall 4 of a tank, oven, furnace, or other region whose temperature is to be controlled. The tube 1 is illustrated for convenience as extending downwardly into the tank. As the temperature in the tank increases, the tube expands, so that the closed lower end 5 thereof moves downwardly, allowing the lower end 6 of the non-expanding rod 8 to move downwardly through a similar distance. The upper end 9 of this non-expanding rod is seated in the lower face of a lower cup 11 slidably mounted for vertical movement in a cylindrical cover 12 which is threaded as at 14 into the casing 2. As the temperature rises, then the expansion of the lower tube 1 permits the non-expanding rod 8 to move downwardly, and as a result the lower cup 11 moves downwardly, under the pressure exerted on it by the pair of bowed leaf-springs 16, 17, whose upper ends are seated in blocks 18, 19, secured to an upper cup 21 generally similar in construction to the lower cup 11. This upper cup 21 is restrained from upward movement by a rod 23 threaded into a disk 24 which is maintained at a constant distance from the lower casing 2 by means of the substantially non-expanding rods 26, riveted at one end to the disk 24 and at the other end to a disk 29 threaded into the lower casing 2.

In the preferred embodiment of the invention, the contacts 31, 32, riveted respectively to the leaf-springs 16, 17, about midway of their length, are normally in circuit-closing position, as indicated in Fig. 2, so that normally the external circuit represented by the leads, 33, 34, is closed at these contacts. With an increase of temperature above normal, however, the downward movement of the lower end 5 of the expanding tube 1 causes the non-expanding rod 8 and lower cup 11 to move downwardly under the pressure exerted thereon by the springs 16, 17, and contact is broken at the points 31, 32. This break in the external circuit is utilized for shutting off or reducing the supply of heat to the tank, but since the means for effecting this forms no part of the present invention, the drawings have been confined to the thermostat itself. Conversely, when the temperature in the tank drops below normal, the expanding tube 1 contracts and forces upwardly the non-expanding rod 8 and lower cup 11, causing the springs 16, 17, to close the external circuit at the contacts 31, 32.

By providing a pair of springs movable toward and away from each other in this manner, a considerable movement of the contacts 31, 32, toward and away from each other is attained for a comparatively small vertical displacement of the lower cup 11, so that the circuit can be effectively broken and effectively closed with but a slight expansion or contraction, as the case may be, of the tube 1. Furthermore, with this construction, a considerable pressure may be maintained in the springs 16, 17, giving adequate pressure at the contact points, and thereby avoiding interruption of the circuit by dirt or other extraneous matter whose electrical resistance might impair the operation of the device if only a light contact-pressure were available.

The leads 33, 34, are electrically connected to the springs 16, 17, respectively, as illustrated in Fig. 2. Each spring is seated at its lower end in a block 35, 36, to which is riveted a threaded shaft 37, 38, passing through an insulating bushing 39, 40, in the cup 11, and projecting below the lower face of the cup to serve as a binding post for the lead. A layer of insulation 41 prevents electrical contact between either block 35, 36, and the cup 11, while the threaded rods 37, 38, hold the blocks 35, 36, in their normal position with respect to the cup. Side plates 42 secured to or integral with each of the four blocks 18, 19, 35 and 36, prevent lateral displacement of the springs with respect to the blocks. The upper blocks 18, 19, are similarly mounted in the upper cup 21, except that the threaded rods associated with the upper blocks are not extended as far beyond the surface of the cup, since they are not connected to leads.

The temperature at which contact is made and broken by the thermostat may be adjusted by raising or lowering the upper cup 21. If the upper cup is moved downwardly, the standard of temperature will be increased, because a greater expansion of the expanding tube 1 will be needed to allow the lower cup 11 to move downwardly far enough to break the circuit at the contacts 31, 32, and shut off the heat. And conversely, if the upper cup 21 is moved upwardly, the expansion needed in the tube 1 to effect disconnection at the contacts 31, 32, is decreased.

This vertical adjustment of the upper cup 21 is effected by turning the knurled nut 44 to rotate the pinion 46 and gear 47 meshing therewith, and the rotation of this gear serves to rotate the threaded rod 23 splined thereto. The rod 23 bears against the upper face of the upper cup 21, and is threaded in the disk 24, as heretofore mentioned. The pinion 46 has a shoulder abutting the upper face of the base 49, to prevent the pinion from moving downwardly below its normal position, while upward movement of the pinion is prevented because the pinion is pinned to the shaft 50, which in turn is pinned to the knurled nut 44, and this nut has a shoulder or face bearing against the lower face 52 of the base 49.

Upward movement of the gear 47 is prevented by the cup 53 secured, as at 54, to the gear and provided with an annular surface bearing against the under side of the base 49. The gear 47 is restrained from moving downwardly, because of its shoulder 55 bearing against the upper face of the base 49.

Since the angular position of the gear 47 is a measure of the vertical position of the upper cup 21, and hence of the temperature standard for which the thermostat is set, this angular position of the gear 47 is preferably utilized to afford a visible indication of this temperature standard. As indicated in Figs. 1 and 4, a scale 56 is mounted on the upper face of the gear and may be viewed through the transparent sight opening 57 in the cover 58, a suitable reading point being provided by means such as the arrows 59.

It will thus be seen that the temperature standard may be manually adjusted, and the standard indicated visibly, simply by turning a single knurled nut.

In the modification illustrated in Fig. 3, the lower cup 60 is mounted directly upon the closed lower end of the casing 62, which in this embodiment of the invention is the expanding element. The upper cup 63 is the one that is connected with the external circuit. The vertical position of this cup may be adjusted by the pinion and gear mechanism of Figs. 1 and 4, or the simpler means comprising the threaded rod 65, slotted at 66 to receive an operating tool, may be utilized. This type of thermostat is particularly applicable to temperatures and other conditions not detrimental to the springs 16, 17.

From the above, it will be seen that in both of the illustrated embodiments of the invention, there is provided a thermostat of simple, compact and inexpensive construction, responsive to slight temperature changes, and reliable under severe operating conditions.

As various possible embodiments might be made of the above invention and as various changes might be made in the embodiments above set forth, it is to be understood that all matter herein set forth or shown in the accompanying drawings is to be interpreted as illustrative and not in a limiting sense.

Having thus revealed my invention, I claim and desire to secure by Letters Patent of the United States:

1. A thermostat combining substantially non-expanding resilient contact-springs bowed toward each other, and movable toward and away from each other, abutments limiting the movement of the springs away from each other, expanding means varying the distance between said abutments with changes of temperature, for effecting movement of said springs toward each other with variations of temperature, the resiliency of the springs causing them to tend to separate from each other, and means for adjusting the standard of temperature at which contact is made and broken.

2. A thermostat combining a pair of substantially non-expanding contact-springs bowed toward each other and movable toward and away from each other with changes in temperature, an expanding element substantially co-axial with the springs, for effecting by its linear expansion the movement of said springs toward and away from each other, and means for adjusting the standard of temperature at which contact is made and broken by said springs.

3. A thermostat combining a pair of contact leaf-springs retained by both ends and movable toward and away from each other with changes in temperature, expanding means substantially co-axial with the springs for effecting such movement of said springs by its linear expansion, and means for adjusting the standard of temperature at which contact is made and broken by the springs.

4. A thermostat combining a pair of resilient leaf contact-springs bowed toward each other, means at either end of these springs forming abutments for the springs for insulating them from each other and from the casing of the apparatus and for limiting the movement of the springs away from each other, and means responsive to temperature changes for varying the distance between said abutments with changes of temperature, to effect movement of said springs toward each other with variations of temperature, to effect making and breaking of the circuit at predetermined temperatures, the resiliency of the springs causing them to tend to separate from each other.

5. A thermostat combining a pair of resilient leaf-springs bowed toward each other and adapted when in contact with one another to complete an electric circuit, means at either end of the springs forming abutments for insulating the springs from each other and from the casing of the apparatus, means substantially co-axial with the springs and responsive to temperature changes for permitting relative movement of said abutments to effect making and breaking of the circuit at predetermined temperatures, and means for adjusting the relative positions of the abutments to vary the standard of temperature maintained.

6. A thermostat combining an expanding tube, a substantially non-expanding rod mounted therein, a member having a seat for said rod and mounted for movement with the rod in a direction axially of the rod, a pair of converging springs seated in said member, a second member having seats for said springs, and means for maintaining said springs under tension, the expansion of the expanding tube permitting the springs to straighten and break contact when a predetermined temperature is exceeded, the contraction of said expanding tube causing the first member to re-approach the second and cause the springs to contact and close the circuit again.

7. A thermostat combining an expanding tube, a substantially non-expanding rod mounted therein, a member having a seat for said rod and mounted for movement with the rod in a direction axially of the rod, a pair of converging springs seated in said member, a second member having seats for said springs, means for maintaining said springs under tension, the expansion of the expanding tube permitting the springs to straighten and break contact when a predetermined temperature is exceeded, the contraction of said expanding tube causing the first member to re-approach the second and cause the springs to contact and close the circuit again, and means for adjusting the second member toward and away from the first.

In testimony whereof, I have signed my name to this specification this fourth day of November, 1916.

EDWIN B. LANE.